(12) United States Patent
McCann

(10) Patent No.: US 10,781,414 B2
(45) Date of Patent: Sep. 22, 2020

(54) SYSTEM AND METHOD FOR REDISTILLING ALCOHOL

(71) Applicant: Detroit Stillworks LLC, Ferndale, MI (US)

(72) Inventor: Matthew P. McCann, Ferndale, MI (US)

(73) Assignee: DETROIT STILLWORKS LLC, Ferndale, MI (US)

( * ) Notice: Subject to any disclaimer, the term of this patent is extended or adjusted under 35 U.S.C. 154(b) by 395 days.

(21) Appl. No.: 15/697,554

(22) Filed: Sep. 7, 2017

(65) Prior Publication Data

US 2018/0066217 A1   Mar. 8, 2018

Related U.S. Application Data

(60) Provisional application No. 62/384,241, filed on Sep. 7, 2016.

(51) Int. Cl.
| | |
|---|---|
| *C12G 3/06* | (2006.01) |
| *F28C 3/04* | (2006.01) |
| *B01D 3/00* | (2006.01) |
| *C12H 6/02* | (2019.01) |

(52) U.S. Cl.
CPC .............. *C12G 3/06* (2013.01); *B01D 3/004* (2013.01); *B01D 3/005* (2013.01); *B01D 3/007* (2013.01); *C12H 6/02* (2019.02); *F28C 3/04* (2013.01)

(58) Field of Classification Search
CPC ........ B01D 3/004; B01D 3/005; B01D 3/007; C12G 3/06; C12H 6/02; F28C 3/04
USPC ........ 426/11, 387, 493, 494, 592; 203/6, 18, 203/21, 73; 159/47.1; 99/277.1
See application file for complete search history.

(56) References Cited

U.S. PATENT DOCUMENTS

| | | | | |
|---|---|---|---|---|
| 2,152,318 | A | * | 3/1939 | Liebmann .............. A23L 3/3409 426/312 |
| 2,364,060 | A | * | 12/1944 | Ditto ....................... C12C 5/023 426/311 |
| 4,978,547 | A | * | 12/1990 | Petershans ............... B01D 1/26 159/47.1 |

* cited by examiner

*Primary Examiner* — Dana Ross
*Assistant Examiner* — Joseph W Iskra
(74) *Attorney, Agent, or Firm* — Stites & Harbison, PLLC; Terry L. Wright

(57) ABSTRACT

A system for redistilling alcohol includes a heating vessel configured to receive a continuous stream of liquid white spirit and vaporize the liquid white spirit and a flavor vessel in direct fluid communication with and downstream of the heating vessel. The flavor vessel houses various botanicals and allows the vaporized white spirit to passes over the botanicals, thereby vaporizing volatile compounds of the botanicals and flavoring the vaporized white spirit. The system further includes a condenser in fluid communication with and downstream of the flavor vessel to obtain a redistilled alcohol product. Methods of redistilling an alcohol are also provided.

17 Claims, 5 Drawing Sheets

SYSTEM AND METHOD FOR REDISTILLING ALCOHOL

RELATED APPLICATIONS

This application claims priority from U.S. Provisional Application Ser. No. 62/384,241 filed Sep. 7, 2016, the entire disclosure of which is incorporated herein by this reference.

TECHNICAL FIELD

The present invention relates to systems and methods for redistilling alcohol. In particular, the present invention relates to systems and methods of redistilling alcohol that make use of a continuous device for the redistillation and modification of a white spirit.

BACKGROUND OF THE INVENTION

Pot stills and column stills are well known devices designed to strip desired volatile components from a mixture of liquids and solids. In a pot still, heat is applied to a pot containing the liquids and solids causing alcohol vapor to rise out of the pot where it is then condensed back into liquid. In column stills, downwardly flowing liquid is continuously mixing and interfacing with upwardly flowing vapors so as to cause volatile components to vaporize in concentrated form from the liquid fed to the column. Different designs for these devices have been proposed, including: columns packed with Raschig rings, saddles, or the like; bubble-cap columns; and other variations.

Pot and column stills are also commonly reused for another step in beverage alcohol production: redistillation. In redistillation, white spirit is pumped back into a pot or column still to be revaporized and run through a botanical basket in which berries, fruits, and herbs are loaded so that as the vapor passes through the botanical basket, the alcohol extracts flavor compounds while volatile compounds are vaporized. In this regard, when white spirit is redistilled in a pot or column still the spirit is rectified and purified, but generally leaves some of its original flavor and water behind.

SUMMARY OF THE INVENTION

The present invention includes systems and methods for redistilling alcohol that make use of a continuous device for the redistillation and modification of white spirit. A typical feedstock of white spirit is 50% to 95% ethanol with the remainder of the solution made of water. In an exemplary system and methods of the present invention, such a white spirit is pumped from a feed tank, through a feed pump, control valve, and flow meter. The fluid is then preheated in an economizer and introduced into the bottom of a heating vessel where it is vaporized by a steam or electrical heating element inside of the heating vessel. The vaporized white spirit then flows up and out through piping and then down into the bottom of one of two flavor vessels. The flavor vessels contain fruits, herbs, grains, or wood for flavor extraction and modification of the white spirit. The flavored white spirit vapor then flows out of the flavor vessels back to the other side of the economizer and finally into the final condenser which cools the vapor back to a liquid for collection in a surge tank.

Further features and advantages of the present invention will become evident to those of ordinary skill in the art after a study of the description, figures, and non-limiting examples in this document.

DESCRIPTION OF EXEMPLARY EMBODIMENTS

Figure 1:
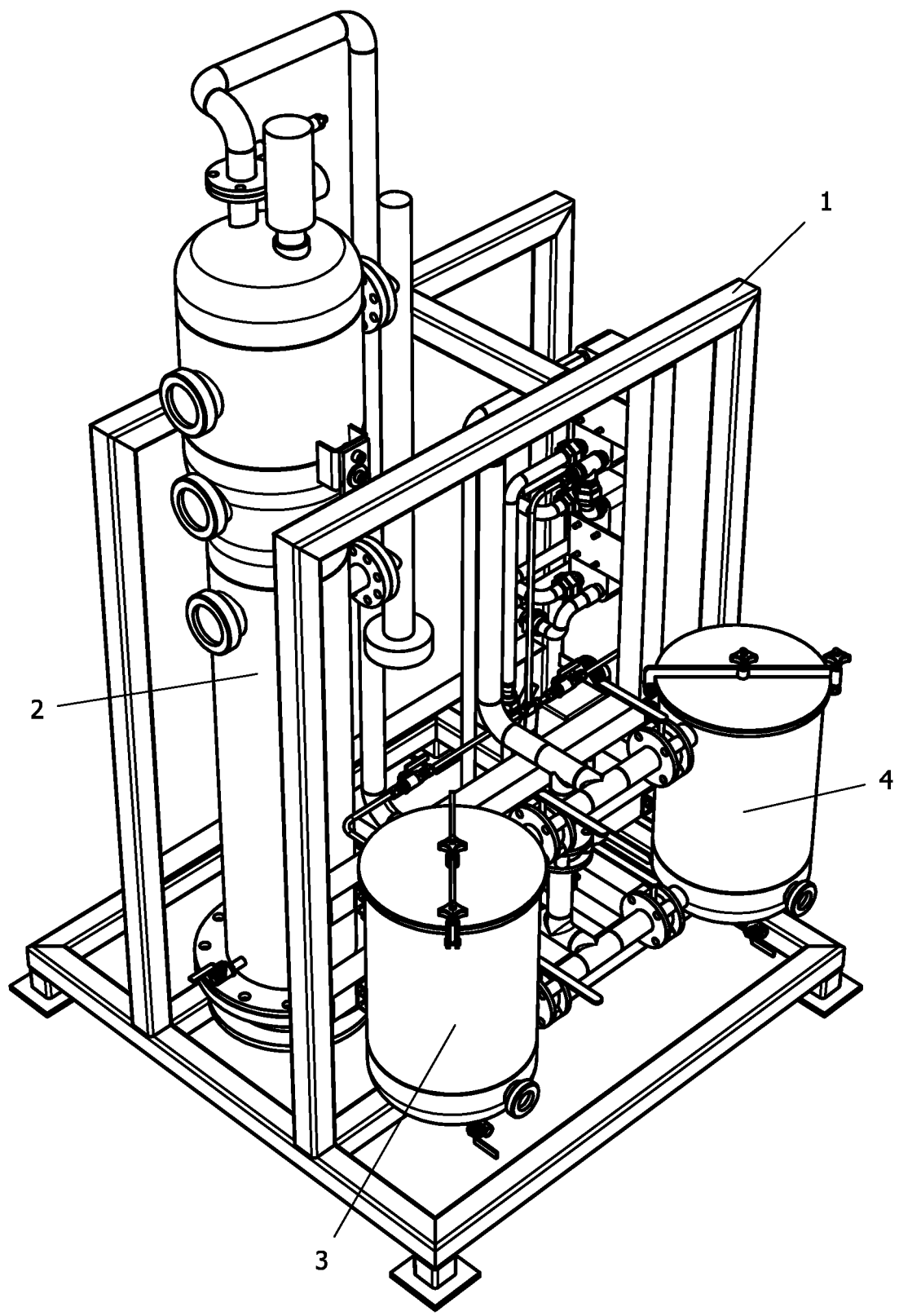
FIG. 1 is a front perspective view of a redistilling system made in accordance with one embodiment of the present invention.

The present invention is a system and method for redistilling a white spirit that maintains the spirit's original flavor and character while adding additional flavor through the use of flavor vessels.

Referring to FIGS. 1-5, a redistillation system made in accordance with the present invention includes a feed pump 6, an economizer 13, a heating vessel 2 operably connected downstream of the economizer 13, one or more flavor vessels 3, 4 operably connected downstream of the heating vessel 2, and a condenser 38 operably connected downstream of the one or more flavor vessels 3, 4, which are in fluid communication with each other and are all secured to a frame assembly 1. Generally, a typical feedstock of white spirit is 50% to 95% ethanol with the remainder of the solution made of water. In the present invention, such a white spirit is first pumped by the feed pump 6 through an economizer 13 where it is preheated before entering the heating vessel 2. In the heating vessel 2, the white spirit is vaporized and the vapors are directed through one or more flavor vessels 3, 4. The now-flavored vapor travels once again through the economizer 13 where it transfers some of its heat into the incoming white spirit. After partially cooling in the economizer 13, the vapor then travels through a condenser 38 where it cools back to a flavored spirit for collection in a surge tank. Advantageously, as a result of the method of the present invention, none of the water added during proofing of the white spirit is lost. That is to say, the original alcohol percentage in the white spirit is identical to the final alcohol percentage in the flavored product.

Referring now more particularly to FIGS. 1-3 and 5, in one exemplary embodiment, the white spirit is fed continuously through the economizer 13 and into the heating vessel 2 from a feed supply pipe 5 by way of a feed pump 6 in the form of a mag drive pump. In some embodiments, the feed supply pipe 5 includes a strainer designed to capture solids or other foreign matter before entering the system of the present invention. A flow meter 10 and control valve 11 respectively monitor and control the flow of the spirit into the distillation system of the present invention. According to some exemplary embodiments of the present invention, an optimal flow rate is between about 0.5 gallons/minute and about 2.5 gallons/minute. Of course other flow rates are possible and a person of ordinary skill would be capable of determining a preferable flow rate for a particular application and to achieve a desired result.

The economizer 13 is a heat exchanger where the incoming white spirit is partially heated, but typically remains in the liquid phase. This reduces the energy needs of the heating vessel 2. Advantageously, the economizer 13 also acts to partially cool the flavored vapor before it enters the condenser 38 which similarly reduces the energy needs of the condenser 38. The partially heated white spirit then travels, by way of piping 14, from the economizer 13 into the bottom of the heating vessel 2.

Figure 2:
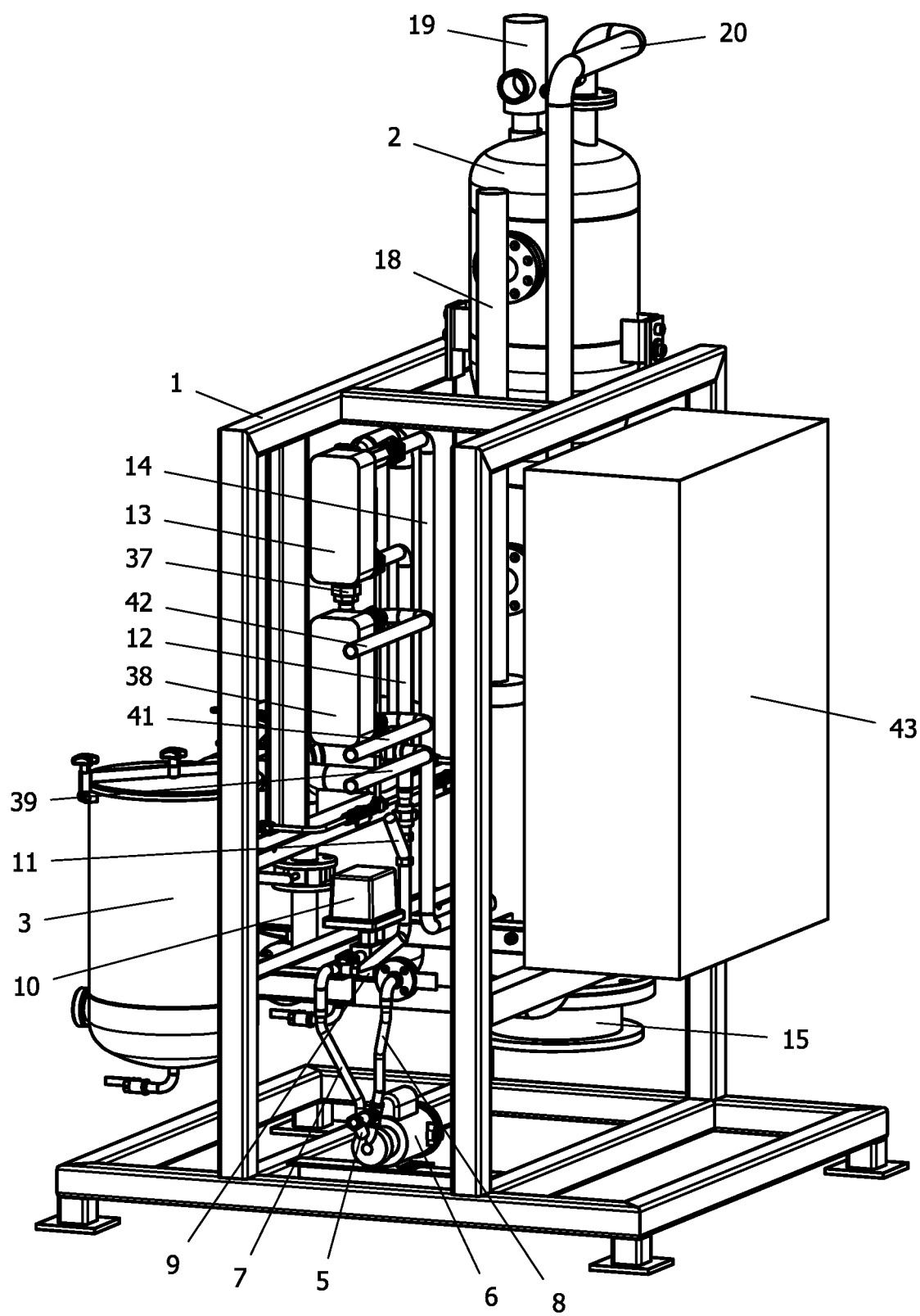
FIG. 2 is a rear perspective view of the system of FIG. 1, and showing the electrical control panel for an electrical heating unit.
Figure 3:
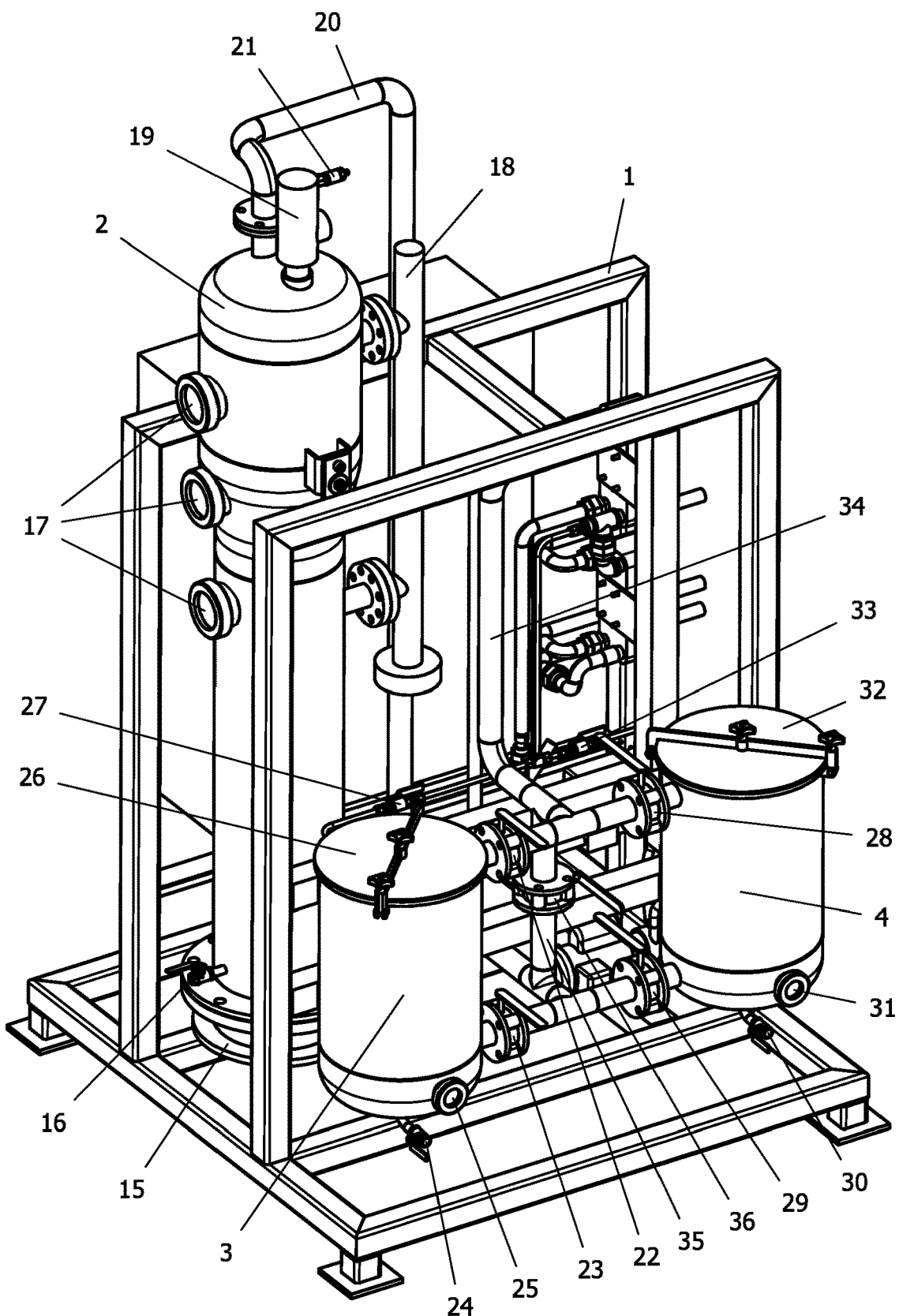
FIG. 3 is another front perspective view of the system of FIG. 1, but highlighting other components of the system.
Figure 4:
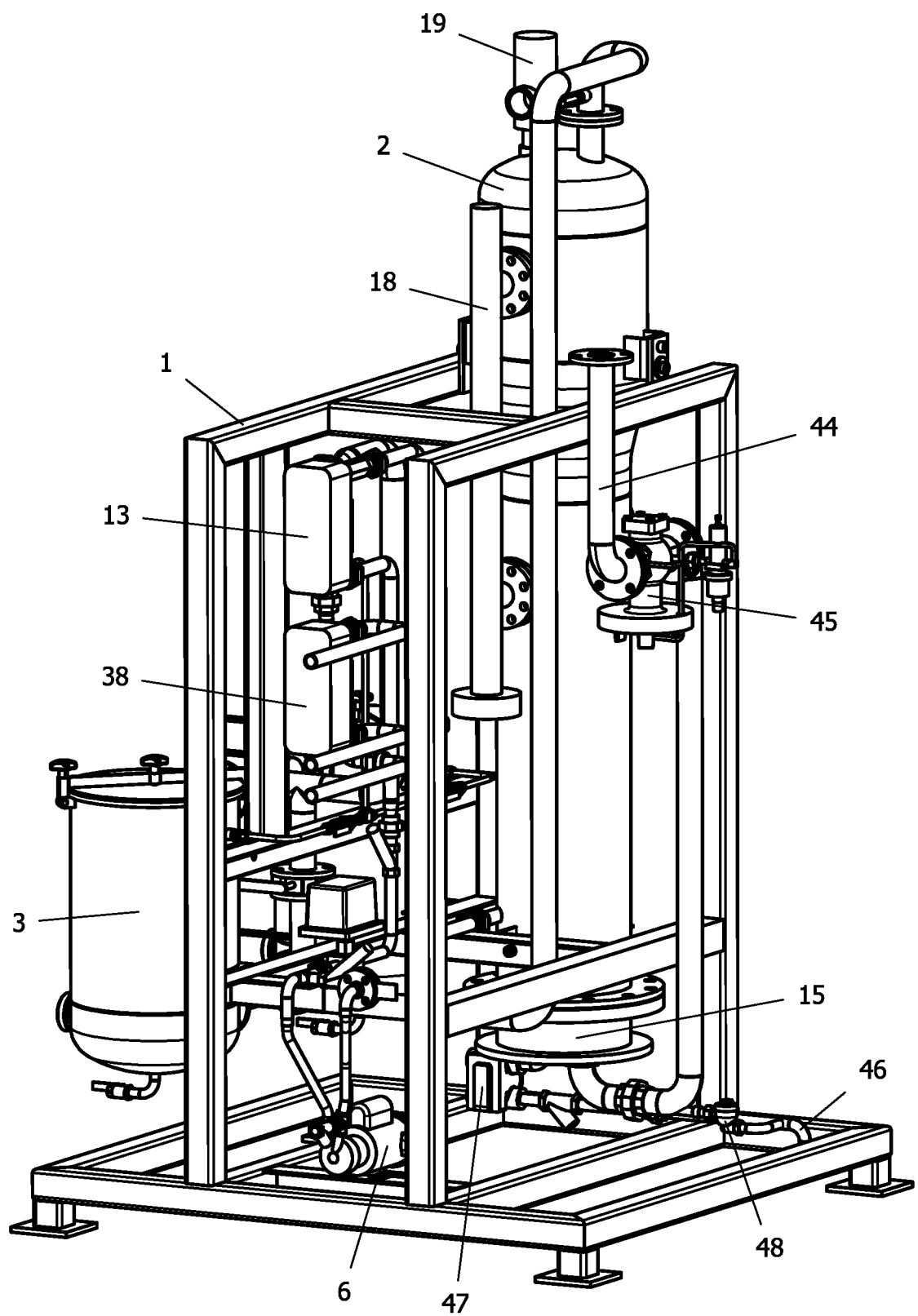
FIG. 4 is a rear perspective view of another redistilling system made in accordance with the present invention substantially similar to the system of FIG. 1 but with a steam heating unit.
Figure 5:
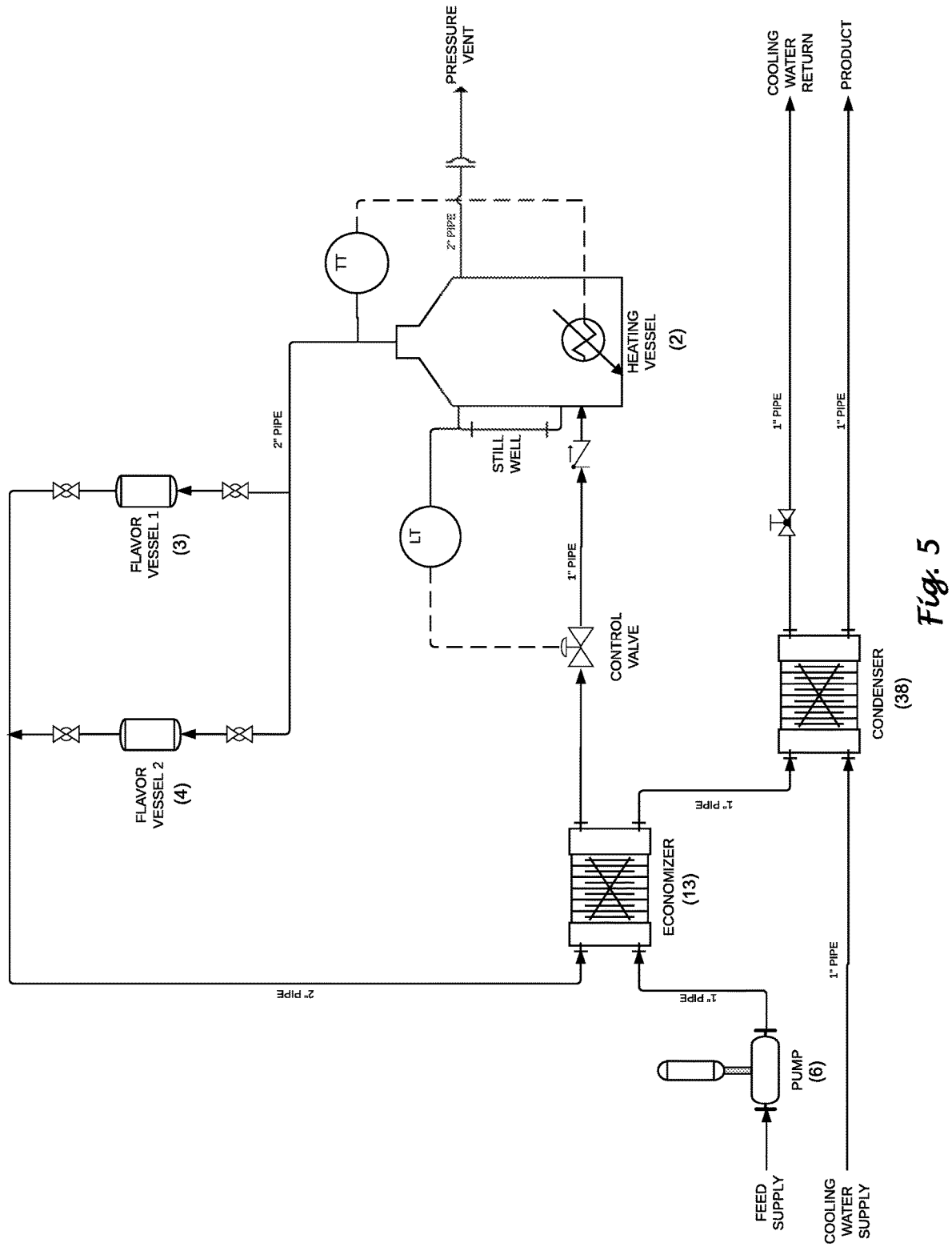
FIG. 5 is a schematic representation of the system of the present invention.

As shown in FIGS. 1-3, the heating vessel 2 is oriented vertically and expands at the top to allow room for vapor expansion. A heating unit 15 is positioned at the bottom of the heating vessel 2 which is heated by a heat source. In this embodiment, the heating unit 15 includes an electrical element controlled by an electric heater power control cabinet 43. However, in some other embodiments, and as shown in FIG. 4, the heating unit 15 is a steam U-tube bundle that is heated by steam supplied from a steam supply line 44 controlled by a steam supply regulator valve 45. Regardless of the particular configuration of the heating unit 15, in some embodiments of the present invention, the heating vessel 2 is heated and maintained at a temperature of about 206° F. Of course other temperatures are possible and a person of ordinary skill would be capable of determining a preferable temperature for a particular application and to achieve a desired result. Furthermore, it is contemplated that the temperature need not be constant throughout the process.

In at least some exemplary embodiments of the present invention, the fill height within the heating vessel 2 varies while running. Accordingly, and referring once again to FIGS. 1-3, the exemplary system further includes a liquid level instrument 18 that monitors the fluid level within the heating vessel 2. In this embodiment, the liquid level instrument 18 is an external level indicator/transmitter that uses a float which is raised and lowered by the fluid level in the heating vessel 2. The float contains a magnet which rotates flags for visual indication of liquid level height and activates reed switches which digitally monitor and transmit liquid level height. This signal is sent to a remote control panel that uses programmable logic controllers (PLCs) to monitor and adjust flow of white spirit into the heating vessel 2. The heating vessel 2 also includes several sight glasses 17 which allow visual monitoring of both the fluid level as well as the heating elements contained within the heating vessel 2. Regardless of the particular configuration of the heating vessel 2, the white spirit pumped into the heating vessel 2 is rapidly vaporized and discharged out of the top of the heating vessel 2, through stainless piping 20, and into one or more flavor vessels 3, 4.

Referring still to FIGS. 1-3, the exemplary flavor vessels 3, 4, are botanical baskets constructed of stainless piping and are oriented vertically with a capacity of 5 gallons. As a non-limited example, the botanicals contemplated for use in the flavor vessels 3, 4, include gin ingredients (Juniper, Coriander, etc.) as well as various, grains, woods, fruits and herbs for flavoring vodka, whiskey, brandy, or any other spirits. Of course, it should be understood that other flavoring botanicals can also be used without departing from the spirit and scope of the present invention.

Each flavor vessel 3, 4 houses one or more perforated stainless sheets (trays) that contain the botanicals and allow for vapor to pass through the botanicals to extract flavoring therefrom. The trays are removable and adjustable, allowing for variable levels of botanicals within each of the flavor vessels 3, 4. To this end, each flavor vessel 3, 4 has a clamping lid 26, 32 that allows loading and removal of the botanicals and trays. It is contemplated that the trays are capable of being secured in place within the flavor vessels 3, 4. In some embodiments, each of the flavor vessels 3, 4 includes a raised stainless steel platform forming an "X" when viewed from above and a central threaded stud that extends upward from the bottom of the flavor vessels 3, 4. In such a configuration, the bottom tray can be positioned directly on the X platform and each of the additional trays can then be locked into place using the central threaded stud. Specifically, a threaded screw is used to lock each tray in place against the central stud. In such an embodiment, where a central threaded stud extends upward through the flavor vessels, it is contemplated that the clamping lid can similarly be held in place using the central threaded stud and a vise handle. Of course, alternative means of locking the trays and/or the lid into place are also contemplated.

The vaporized white spirit enters the flavor vessels 3, 4, from the side through an inlet valve 23, 29 located near the bottom of the flavor vessel 3, 4. The vapor can be selectively directed between the two flavor vessels 3, 4 by way of the valves 23, 29, which are, in this embodiment, hand operated. Within each of the flavor vessels 3, 4 is stainless piping with downward facing holes that is operably connected to each of the valves 23, 29. The vapor entering through the inlet valves 23, 29 of the flavor vessels 3, 4, exits the stainless piping through the downward facing holes which prevents any high velocity upward flow of vapor. The downward facing holes also cause any condensate within the flavor vessel 3, 4 to reboil. To this end, each flavor vessel 3, 4 also has a sight glass 25, 31 which allows for monitoring of the sump (condensate) level, ensuring that the fluid is vaporized before contacting the botanicals. After the vaporized white spirit enters the flavor vessels 3, 4 at the bottom, the vaporized white spirit passes upward through the perforated trays containing the botanicals before exiting through an outlet valve 22, 28 located near the top of the flavor vessel 3, 4. Once again, according to some exemplary embodiments of the present invention, an optimal flow rate is between about 0.5 gallons/minute and about 2.5 gallons/minute, but other flow rates are possible and a person of ordinary skill would be capable of determining a preferable flow rate for a particular application and to achieve a desired result. For example, increasing or decreasing flow rates causes different extraction of flavoring from the botanicals contained in the flavor vessels 3, 4.

Referring once again to FIGS. 1-3 and 5, the now-flavored spirit vapor flows from the flavor vessels 3, 4 back to the economizer 13 where, as previously mentioned, the flavored vapor transfers heat into the white spirit entering the system, thus partially cooling the flavored vapor before it enters the condenser 38. In the exemplary embodiment, the economizer 13 and condenser 38 are brazed plate heat exchangers with copper internals, but other known configurations are also contemplated.

The redistillation system of the present invention does not require a rectification column or a pot still. The system is compact, standalone, simple to operate, and easily transported. The heat transfer efficiency approaches 100% and the alcohol yield is 100%. As such, all of the white spirit's original flavor and character is maintained while still adding additional flavor through the use of botanicals.

Turning now to the methods of redistilling alcohol of the present invention, in one exemplary implementation of a method of the present invention, white spirit at 100-190 proof (50-95% alcohol) is first fed from a supply tank into an exemplary redistilling system through an industry standard tri-clamp fitting detachable hose. In some implementations, the white spirit is fed through a variable speed pump into a heating vessel which includes a heating unit (either electric or steam based). In a single pass through the heating vessel, the liquid is heated and vaporized before it exits the heating vessel. It is contemplated that the heating vessel can vaporize up to two gallons per minute, but in most implementations, it is the case that all fluid that enters the system is vaporized and flows through stainless piping into multiple flavor vessels (botanical baskets).

As described above, the flavor vessels are typically constructed of stainless piping and are oriented vertically with a capacity of 5 gallons. Optional botanicals that can be included in the flavor baskets include gin ingredients (Juniper, Coriander, etc.) as well as various fruits and herbs for flavoring vodka, whiskey, brandy, or any other spirit. Vapor enters the lowest point of the flavor vessels from the side through stainless piping with downward facing holes to reboil any condensate and prevent any high velocity upward flow of vapor. In this regard, in some implementations, the flavor vessels include perforated stainless sheets to contain the botanicals and allow for vapor flow/extraction. Vapor then exits the top of the flavor vessels travels through stainless piping to an economizer (heat exchanger), then to a single condenser shared by the flavor vessels. Each flavor vessel typically has ball valves at the inlet and outlet to allow flow modification and sequential activation. The economizer then removes heat from the final product vapor while preheating the incoming spirit before the heating unit boils the fluid. The final condenser cools the vapor back to a liquid through indirect contact with flowing water. The product exiting the system then flows into a collection tank.

One of ordinary skill in the art will also recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

BRIEF DESCRIPTION OF REFERENCE NUMERALS

Several components of the present invention labeled in the Figures were not expressly mentioned in the description above. A brief description of all reference numbers is provided below, and which provides further description of each component part of one exemplary redistilling system of the present invention.
1. Frame assembly
2. Heating vessel assembly
3. Flavor vessel 1 assembly
4. Flavor vessel 2 assembly
5. Feed pipe with strainer
6. Feed pump
7. Pump discharge pipe
8. Pump discharge bypass pipe
9. Pump discharge bypass flow meter
10. Feed flow meter
11. Feed control valve
12. Feed pipe to economizer
13. Economizer
14. Feed pipe to heating vessel
15. Heating vessel heater unit (electric or steam)
16. Heating vessel drain valve
17. Heating vessel sight glass
18. Heating vessel liquid level instrument
19. Heating vessel pressure relief valve
20. Vapor pipe to flavor vessels
21. High liquid level switch
22. Flavor vessel 1 outlet valve
23. Flavor vessel 1 inlet valve
24. Flavor vessel 1 drain valve
25. Flavor vessel 1 sight glass
26. Flavor vessel 1 lid
27. Flavor vessel 1 pressure relief valve
28. Flavor vessel 2 outlet valve
29. Flavor vessel 2 inlet valve
30. Flavor vessel 2 drain valve
31. Flavor vessel 2 sight glass
32. Flavor vessel 2 lid
33. Flavor vessel 2 pressure relief valve
34. Vapor pipe to economizer
35. Flavor vessels vapor bypass pipe
36. Flavor vessels vapor bypass valve
37. Economizer to condenser pipe
38. Condenser
39. Product outlet pipe
41. Condenser cooling water supply pipe
42. Condenser cooling water return pipe
43. Electric heater power control cabinet
44. Steam heater steam supply pipe
45. Steam supply regulator valve
46. Steam heater condensate return pipe
47. Primary condensate trap
48. Secondary condensate trap

What is claimed is:

1. A system for redistilling alcohol, comprising:
a heating vessel configured to receive a continuous stream of liquid white spirit and vaporize the liquid white spirit;
a flavor vessel in fluid communication with and downstream of the heating vessel, the flavor vessel configured to house botanicals and allow the vaporized white spirit to pass over the botanicals and vaporize volatile compounds present in the botanicals;
an economizer in fluid communication with the heating vessel and the flavor vessel; and
a condenser in fluid communication with and downstream of the flavor vessel, the condenser also being in fluid communication with and positioned downstream of the economizer such that white spirit exiting the flavor vessel passes through the economizer before reaching the condenser.

2. The system of claim 1, further comprising a feed pump for supplying the liquid white spirit to the heating vessel.

3. The system of claim 2, wherein the feed pump supplies the white spirit to the heating vessel via a feed supply pipe having a strainer for capturing solid material present in the liquid white spirit.

4. The system of claim 1, wherein the heating vessel includes an electrical heating unit.

5. The system of claim 1, wherein the heating vessel includes a steam heating unit.

6. The system of claim 1, wherein the heating vessel is oriented vertically in the system and includes an expanded top portion.

7. The system of claim 1, wherein the heating vessel is operably connected to a liquid level instrument for monitoring fluid level within the heating vessel.

8. The system of claim 1, wherein the flavor vessel includes one or more perforated trays for containing the botanicals.

9. The system of claim 1, wherein the flavor vessel includes an inlet positioned in a bottom portion of the flavor vessel and an outlet located near a top portion of the flavor vessel.

10. The system of claim 9, wherein the inlet of the flavor vessel directs the flow of the vaporized white spirit downward into the flavor vessel.

11. The system of claim 1, wherein the flavor vessel includes a first flavor vessel and a second flavor vessel.

12. The system of claim 1, further comprising a frame assembly for housing the heating vessel, the flavor vessel, and the condenser.

13. A method of redistilling alcohol comprising the steps of:
introducing a liquid white spirit into a system for redistilling alcohol, the system for redistilling alcohol comprising
a heating vessel configured to receive a continuous stream of the liquid white spirit and vaporize the liquid white spirit;
a flavor vessel in fluid communication with and downstream of the heating vessel, the flavor vessel configured to house botanicals and allow the vaporized white spirit to pass over the botanicals and vaporize volatile compounds present in the botanicals,
an economizer in fluid communication with the heating vessel and the flavor vessel, and
a condenser in fluid communication with and downstream of the flavor vessel, the condenser also being in fluid communication with and positioned downstream of the economizer such that white spirit exiting the flavor vessel passes through the economizer before reaching the condenser;
vaporizing the liquid white spirit in the heating vessel;
directing the vaporized white spirit over botanicals housed in the flavor vessel;
directing the vaporized white spirit from the flavor vessel to the economizer to partially cool the white spirit; and
condensing the vaporized white spirit from the economizer in the condenser to obtain a redistilled alcohol product.

14. The method of claim 13, wherein the step of vaporizing the liquid white spirit comprises heating the liquid white spirit to a temperature of about 206° F.

15. The method of claim 13, further comprising the step of reboiling a condensate formed in the flavor vessel.

16. The method of claim 13, wherein an alcohol percentage of the redistilled alcohol product is equal to an alcohol percentage of the liquid white spirit.

17. The method of claim 13, wherein the botanicals are comprised of grains, woods, fruits, or herbs for flavoring a spirit.

* * * * *